April 13, 1948. P. TRAUGOTT 2,439,640
ELECTROCARDIOGRAPH
Filed May 24, 1944 5 Sheets-Sheet 4
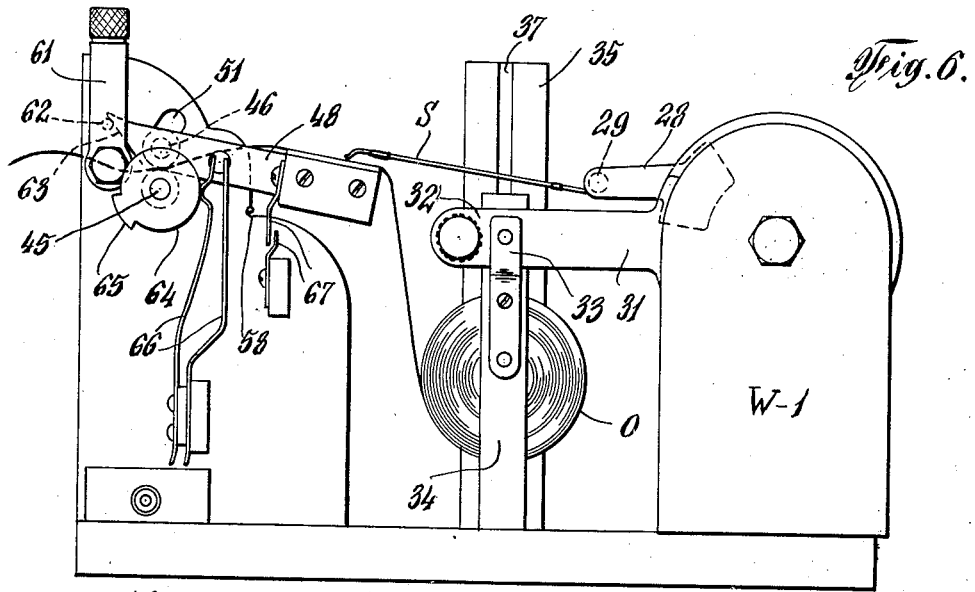
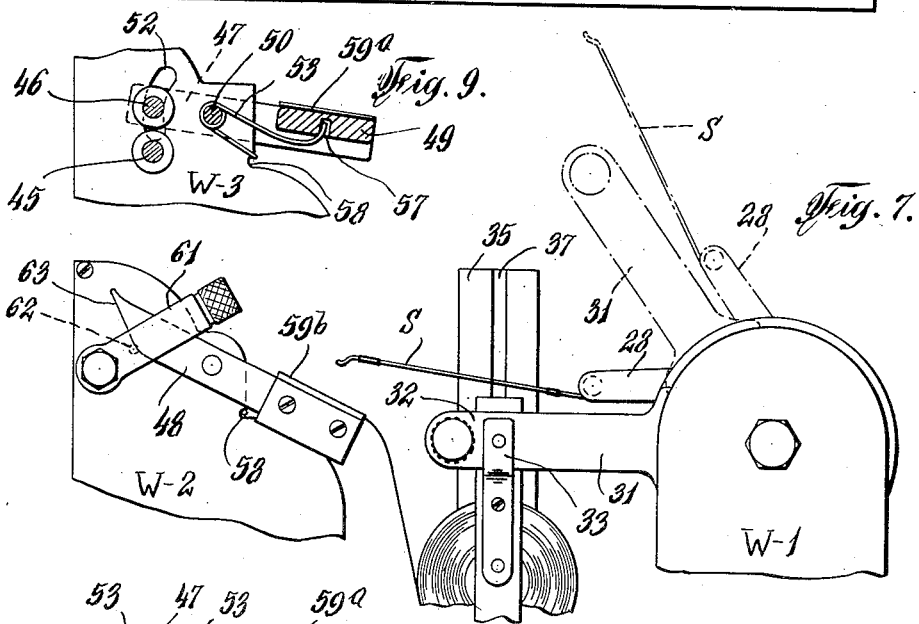
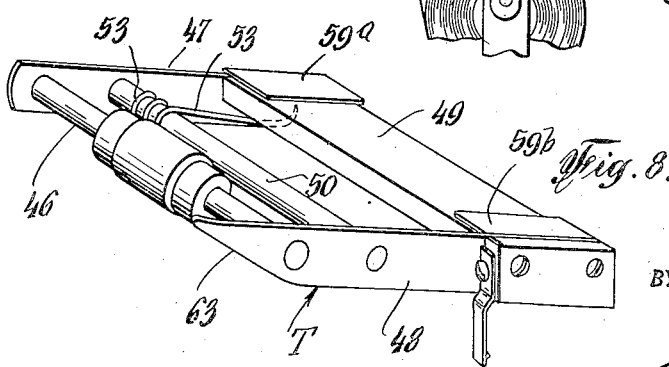
INVENTOR.
Paul Traugott
BY
ATTORNEY April 13, 1948. P. TRAUGOTT 2,439,640
ELECTROCARDIOGRAPH
Filed May 24, 1944 5 Sheets-Sheet 5
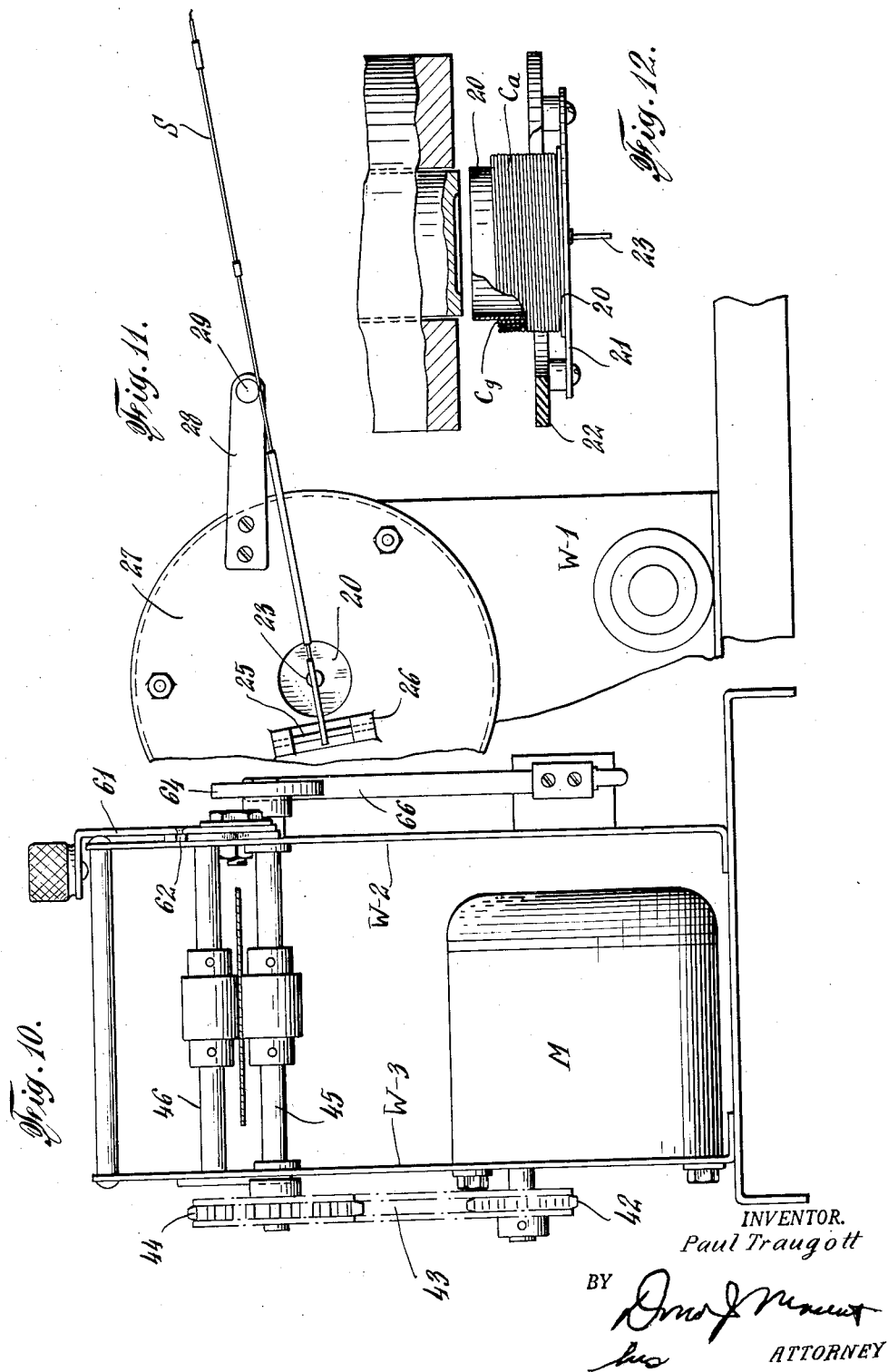
INVENTOR.
Paul Traugott
BY
ATTORNEY Patented Apr. 13, 1948

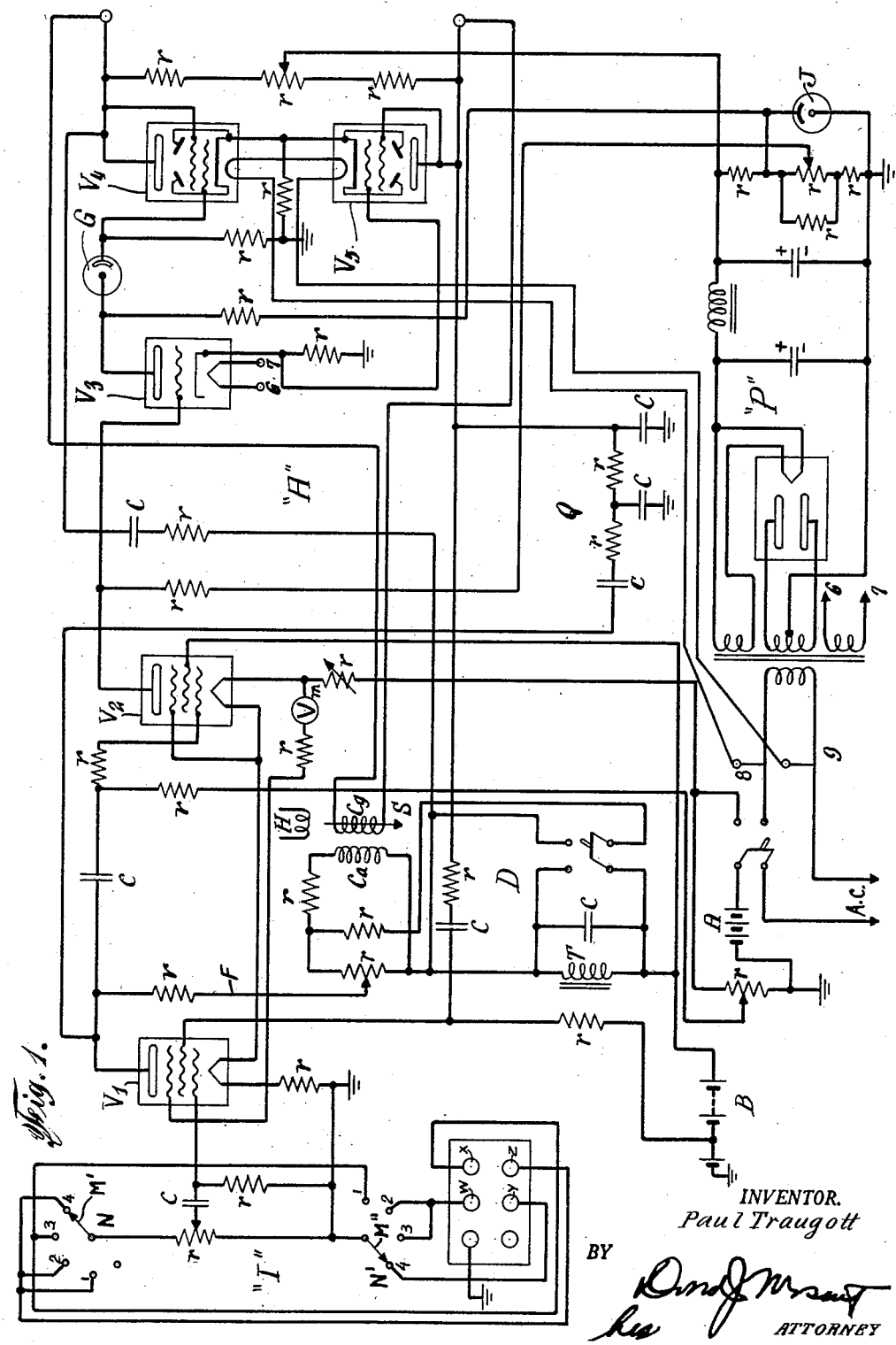

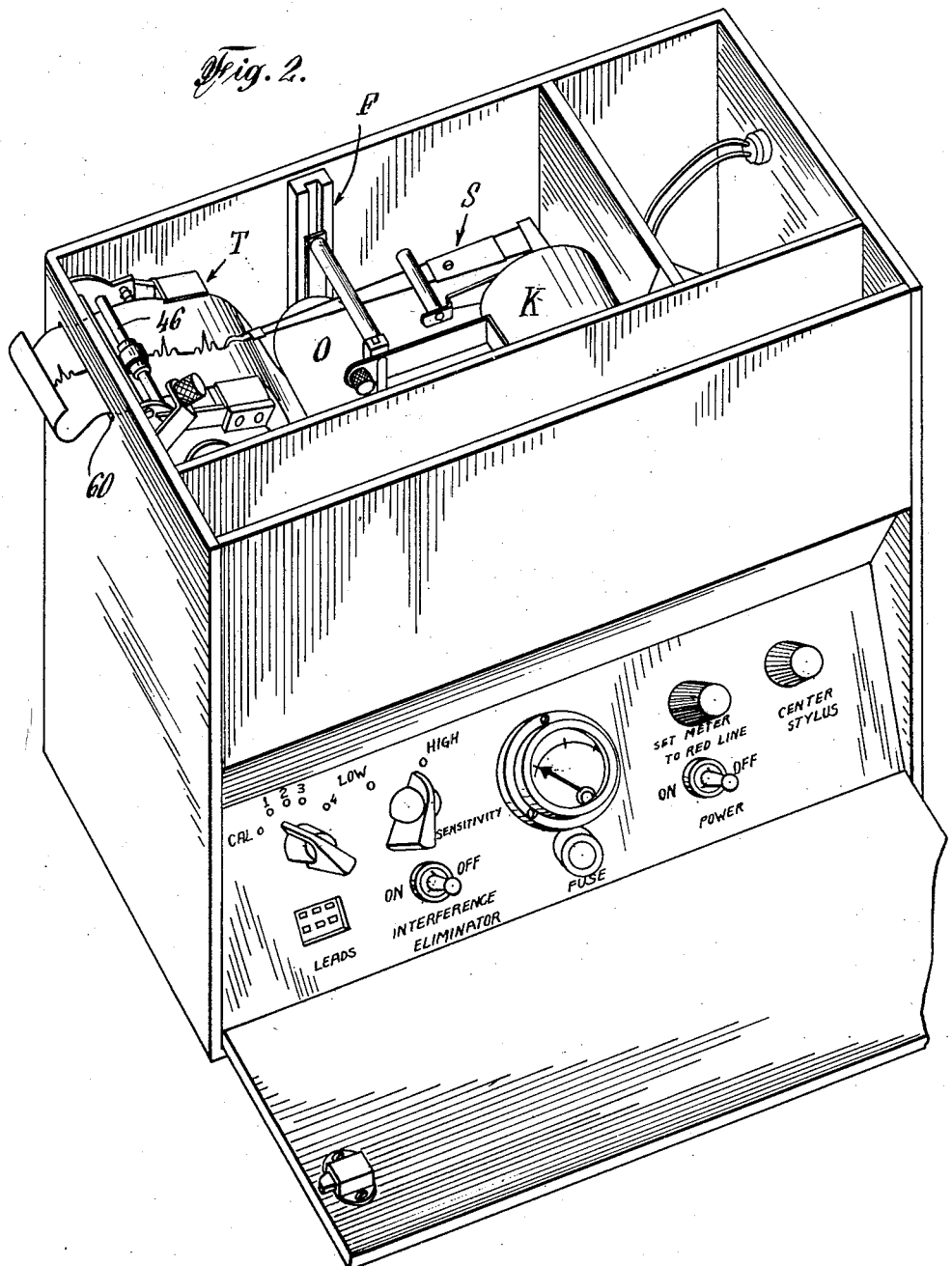

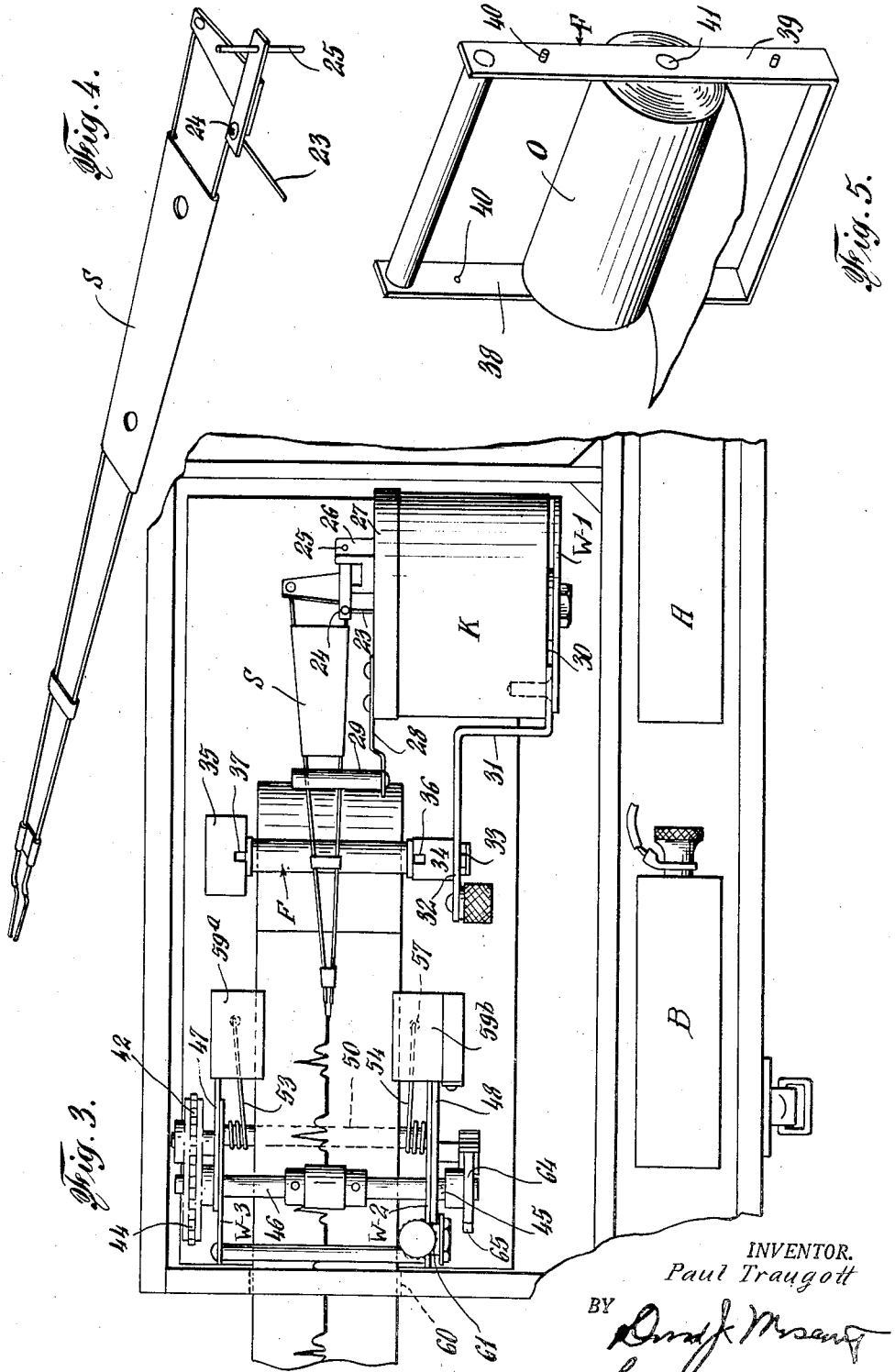

2,439,640

UNITED STATES PATENT OFFICE 2,439,640

ELECTROCARDIOGRAPH

Paul Traugott, New York, N. Y., assignor to Electro-Physical Laboratories, Inc., New York, N. Y., a corporation of New York Application May 24, 1944, Serial No. 537,175

7 Claims. (Cl. 128—2.06)

This invention relates to improvements in electro-cardiographs, being particularly directed to a device for making instantaneous, direct electro-cardiograms, immediately visible as produced, while at the same time eliminating the presence of excessive arc-error common to the movable stylus type recording unit heretofore employed.

Since the operation of a direct-writing electro mechanical recording system of the type herein employed requires the use of a push-pull amplifier of fairly high power capacity for very low frequency response, one of the objects of this invention is to provide a phase inverter circuit of a type that will provide suitable coupling to this push-pull amplifier, thereby permitting phase inversion at the low frequencies required in operation.

Since direct-writing electro-cardiograms involve the use of swinging styluses which, by their operation, of necessity develop overshooting, it is a further object of this invention to provide a means for control of the overshooting movement of the stylus, without otherwise destroying the necessary mechanical and electrical characteristics.

A further object of the invention is to provide a mechanical control of the moving paper chart of such a type that no interruption of electrical circuits are involved in the starting or stopping of the chart movement.

A further object of the invention is to provide a continuous automatic means for calibrating the amplifier and its associated writing-galvanometer continuously and automatically at fixed time intervals.

Another object of the invention is to provide electrical means for greatly reducing the effect of interfering electrical fields while making the cardiogram.

These and further objects of the invention will become more apparent in the following description of a preferred embodiment of the invention illustrated in the drawing, wherein:

Fig. 1 is a schematic outline of the electronic circuit according to my invention for effectuating the production of an electrocardiogram.

Fig. 2 is a perspective view of the mechanical assembly applied with the electronic circuit.

Fig. 3 is a plan view of the mechanical assembly.

Fig. 4 is a perspective view of the stylus mechanism.

Fig. 5 is a perspective view of the chart carriage.

Fig. 6 is a side elevation of the mechanical assembly in operative position.

Fig. 7 is a side elevation of the mechanical assembly showing relative displacement of the writing table and the galvanometer unit at inoperative position.

Fig. 8 is a perspective view of the writing frame.

Fig. 9 is a side elevation partly in section, of the mounting structure for the writing frame.

Fig. 10 is an end elevation showing the chart driving assembly.

Fig. 11 is an end elevation showing the stylus mounting structure.

Fig. 12 is a plan view in section showing the stylus drive assembly.

Referring particularly to Fig. 1 of the drawing wherein is outlined a schematic layout of the electronic circuit effectuating the production of an electro-cardiogram, wherein the potential changes generated by the cardiac action of a patient are visually defined as they occur, such circuit has, for the purpose of this disclosure, been subdivided into three sections, namely, the amplifier circuit, the power circuit and the input circuit.

Since the essence of my invention lies in the improved amplifier circuit and the elements and sub-circuits associated therewith, the power and the input circuits will be discussed only generally. Since certain of the elements and sub-circuits of the amplifier circuit are used in a well known manner for well defined purposes, their constituents and their functions will be indicated only by conventional electronic graphical representations and/or descriptive indicia, and specific details will herein be given only to those electrically and physically functioning elements having new and different properties and whose operation develops new and different results.

The input circuit I incorporates a plug-in unit for connection of leads from the patient and switching units for connection of the selected leads to the amplifier circuit A so that the potential generated by the cardiac action of the patient may be fed thereto.

The sockets for the patient leads are marked W for the left leg, X for the left arm, Y for the right leg and Z for the chest, the respective sockets for such leads being connected in any desired combination by two switches N and N' having corresponding fixed contacts 1 to 4 and manually displaceable rotor or contact blades M' and M", to deliver the body impulse effects from the patient through the potentiometer assembly of input circuit I leading to the grid of tube V—1. Although for illustrative purposes two switches N and N' are disclosed for establishing the aforementioned body connections, I may apply in lieu thereof a single two-way or double-pole switch operating in connection with opposing sets of contacts 1 to 4, directed to the sockets W, X, Y and Z and wherein actuation of a double-pole rotor or movable contact of the switch will connect in circuit respectively, any two desired of the aforementioned sockets.

The power supply circuit P incorporates a standard rectifier and filter system for translating A. C. line current into D. C. potentials for the various sub-circuits in amplifier unit A, and incorporates direct connections for delivering A. C. current of required potential to the heaters of vacuum tubes as 6—7 for V—3, and 8—9 for V—4 and V—5, and to provide A. C. of the requisite voltage to operate certain mechanical elements, namely, the stylus heating element H, a transformer (not shown) and the chart driving motor M (see Fig. 10). Current is supplied to the heaters of vacuum tubes V—1 and V—2 by an "A" battery while a "B" battery supplies required potential for the plate circuit of V—1, and power supply P provides the requisite potential for V—2. The gas tube J in the power circuit serves as a voltage regulator in association with the voltage divider across which it is connected.

In order to realize a single ended input and a push-pull output with the resistance-coupling of vacuum tubes V—1 to V—5, I provide a novel phase-inverting stage by incorporating a gas tube G to couple vacuum tubes V—3 and V—4. The gas tube G, which may be of the neon type as connected between vacuum tubes V—3 and V—4 serves to provide a static voltage drop so that D. C. potential applied to the grid of vacuum tube V—4 may be equal to that applied to the grid of vacuum tube V—5. Since the dynamic voltage drop across the neon tube G is so low as to be negligible, this gas tube provides an interstage coupling medium which has negligibly small phase shift and attenuation at the currents of extremely low frequency involved in electrocardiograph operation.

In order to reduce the effect of interfering currents, I have applied a degenerative filter circuit D to provide a very high discrimination against interfering A. C. current, as for example, heating or power appliances in the same or adjacent rooms, the inductor, capacitor and resistor elements of this sub-circuit being connected between the respective outputs of vacuum tubes V—1 and V—5.

The writing stylus S which is transversely reciprocated by the movable driving coil $C_g$ of the electro-dynamic writing galvanometer connected across the output of the amplifier circuit A in response to the cardiac action translated in terms of potential, tends to overshoot by virtue of the inertia product generated in its reciprocatory displacements, making it necessary to provide a medium for damping out the same and maintaining the necessary direct proportionality between the velocity of the stylus and its frequency of movement, in order that the reading on the chart shall give a true record of the electrical potentials involved in cardiac action. To effectuate this required condition, I mechanically couple to the galvanometer driving coil $C_g$ an auxiliary coil $C_a$ movable in the same magnetic field and with the same velocity, said auxiliary coil being connected to the output of vacuum tube V—1 through a potentiometer and limiting resistor.

The mechanically coupled coils $C_g$ and $C_a$, which move simultaneously in the fixed magnetic field, as aforesaid, are spaced so that the coefficient of magnetic coupling between them is substantially zero over the range of frequencies involved, namely, from .1 to 100 cycles per second, the number of turns or windings of coil $C_g$ being considerably greater than that of $C_a$, the numerical relationship being on the order of several hundred to one. The coils $C_g$ and $C_a$ are wound in such relative direction and connected to their respective circuits with such relative polarity so that upon the simultaneous movement of the two in the fixed magnetic field as aforesaid, a current of opposing polarity is induced from the magnetic field into the respective coils $C_g$ and $C_a$ and developed in their respective circuits, the function and effect of which is later described.

In addition to the auxiliary coil connected as above, I provide a resistor-capacitor network Q between the output of vacuum tube V—1 and the output of the amplifier circuit A.

The auxiliary coil $C_a$ and the network Q function to eliminate the inertia product generated by the movement of the writing stylus in the following manner: As the cardiac potential of the patient is impressed on the circuit and amplified, its effect is translated through reciprocatory movement of the coil $C_g$ and consequently the stylus S onto the chart; the force of inertia developed in the thus moving stylus tends to displace the stylus beyond the true reading corresponding to the cardiac action of the patient. Since the auxiliary coil $C_a$ is mechanically coupled to the galvanometer coil $C_g$, the movement of the former in the same magnetic field generates an electric potential of such phase that after passage through the amplifying circuit it has produced an electrical force in opposition to and substantially cancelling out the force due to inertia developed in the stylus movement. However, as the auxiliary coil $C_a$ in its movement develops the aforesaid counterinertia force, it simultaneously produces in the amplifying circuit an unwanted electrical degenerative potential which tends to reduce the velocity of the stylus, and since for correct electro-mechanical galvanometer operation the velocity of the stylus must be directly proportional to the frequency, such electrically degenerative effect is compensated for by the resistor-capacitor network Q which produces a regenerative potential opposite in effect to such unwanted degenerative potential. Incidentally, through the functioning resistor-capacitor network Q, as aforesaid, a further electrical potential of such phase is transmitted additively to that developed by the auxiliary coil in its movement, that the inertia product of the stylus-galvanometer coil is further reduced.

In operation, the apparatus functions from the electronic standpoint in the following manner:

Assuming that the socket Z connected to the patient's chest and the socket Y connected to the patient's right leg are connected respectively to the contacts 4 and 1 of switches N and N', an impulse developed by the patient and which may for the purposes hereof be designated as of positive polarity, is brought into the circuit and impressed upon the grid of tube V—1. This positive pulse of signal is amplified and its phase reversed through the action of tube V—1 so that it appears as a negative pulse at the grid of tube V—2; the pulse is further amplified and its phase is again reversed so that it appears at the grid of V—3 as a positive pulse. As the grid of tube V—3 is thus made increasingly positive, the plate current of tube V—3 increases, resulting in a drop across the plate resistor R thereof, and since this same increased plate current flows through the cathode resistor R thereof, the cathode of such tube becomes more positive. An amplified negative pulse is received on the grid of tube V—4 through the gas tube G which functions as an infinite capacity, while the grid of tube V—5, which is connected to the cathode of tube V—3 will receive a positive pulse; simultaneously, the voltage at the plate of tube V—4 will increase and the voltage at the plate of tube V—5 will correspondingly decrease.

Since the moving coil Cg connected between the plate of tube V—4 and the plate of tube V—5 now has a voltage differential thereacross, current will flow therethrough causing it to move in its magnetic field. This movement is translated to the stylus S, which, being heated, now makes a mark on the writing strip in correspondence with the form and magnitude of the pulse originally applied to the grid of tube V—I.

Since the connection of the coil Cg between the plates of tubes V—4 and V—5 and the polarity of the magnetic field are such that an increasing (positive pulse) voltage at the plate of tube V—4 and a decreasing (negative pulse) voltage at the plate of tube V—5, the coil will be displaced in a given direction at right angles to the magnetic field. The direction of the current which, when flowing through the coil Cg causes the same to move in the aforesaid given direction, will be opposite to the direction of the current induced in the auxiliary coil Ca when auxiliary coil Ca is displaced, since the latter is physically mounted in direct movement association with coil Cg.

Since, electronically, auxiliary coil Ca is connected back to point F in the plate circuit of tube V—I through a potentiometric network, when a positive pulse at the plate of tube V—4 causes coils Cg and Ca to move in the same given direction in the magnetic field, a positive pulse of an adjustable magnitude is produced by auxiliary coil Ca at the grid of tube V—2 and such pulse, after passing through the amplifier tubes V—2 and V—3, emerges at the plate of tube V—4 as a negative pulse which tends to restrain the movement of the coil Cg initiated by the positive pulse normally at such plate by virtue of the impressed impulse from the patient, and such effect constitutes a degenerative damping.

However, while the coils Cg and Ca are moving under the amplified positive pulse initially applied to the grid of tube V—I, the aforementioned degenerative damping or restraining force tends to reduce the velocity of the coils and the stylus attached thereto and may not be desirable therefor, since it is only intended to produce the major part of this restraining force to affect the coil movement when such movement is due to mechanical inertia and not to an amplified impulse applied to the grid of tube V—I. A regenerative sub-circuit incorporating network Q is therefore inserted to counter the undesired portion of the degenerative damping effect, such network comprising a combination of resistors and capacitors, designed to restrict its effect to a specific frequency band, without which limitation the amplifier would tend to oscillate at some high frequency. By means of this regenerative sub-circuit, the negative pulse which appears at plate of tube V—5 is applied, after attenuation to a suitable magnitude, to the grid of tube V—3 where after passage through tubes V—3 and V—4 it appears at plate V—4 as a positive pulse just sufficient to cancel the restraining force only of the amplified negative pulse produced by coil Ca.

However, this cancellation effect will operate only against a coil movement produced by an amplified signal which was initiated as a positive pulse on the grid of tube V—I since in the absence of a positive pulse on plate of tube V—4 and a negative pulse on plate of tube V—5 as a result of the amplification of such input pulse, movement of the coil Cg by inertia in the same direction as was caused by positive signal pulse on the plate of tube V—4 will cause a pulse of opposite polarity (negative pulse) to appear at such plate. Since the network Q will feed such negative pulse derived from such inertia effect back to the grid of tube V—3, a positive pulse from this source will be produced at the plate of tube V—4 acting to further damp or restrain inertia movement of coils Cg and Ca.

Reference will now be had to the remaining figures of the drawing wherein are disclosed the mechanical elements in their operative assembly.

Referring particularly to Fig. 2, the cabinet is partitioned to provide respectively a chamber (not shown) for mounting the chassis carrying the electrically functioning elements, an upper chamber for mounting the chassis incorporating the mechanical functioning elements, a battery chamber and a control panel so arranged as to provide for ready visibility and accessibility of respective elements thereof, when opened, at the same time forming a portable unit when closed.

Referring to Figs. 2 and 12 wherein are shown in detail mechanically functioning elements, the same may be grouped into the following associated units: the galvanometer-stylus assembly shown at the right, the chart carriage assembly shown at the center, and the writing table and chart drive assembly shown at the left.

The galvanometer assembly, incorporates in a cylindrical casing K, journalled to one of the vertical walls W—I of the mechanical chassis, the well known electrical functioning elements required for the electro-dynamic type thereof, and reference will be had only to those elements functioning to effectuate the activation of the stylus S. Referring particularly to Fig. 12, the main driving coil Cg and the auxiliary driving coil Ca, are in my preferred embodiment mechanically coupled by mounting on the same support 20 for transverse reciprocation in a common magnetic field. A flexible diaphragm 21 is peripherally fixed to the frame 22 to which is attached the support mounting the aforesaid moving coils, said diaphragm carrying an axially extending stylus drive pin 23 at its center. The free end of the stylus drive pin 23 is likewise rigidly and insulatingly connected at 24 adjacent the drive end of the longitudinally extending stylus S which mounts at said end a vertically extending pin 25 pivotally journalled in bearings 26 disposed on face 27 on the galvanometer casing to permit transverse reciprocation of the stylus S in response to the movement of the driving coils Cg and Ca, its associated diaphragm 21 and drive pin 23. By virtue of this construction I am enabled to employ a relatively long stylus, to translate at its free end a relatively large and readily visible graphical representation of the amplified cardiac action with a minimum of arc-error. The stylus S is provided at its writing terminal with a loop of resistance wire capable upon passage of current to develop sufficient heat for forming by contact a visible impression on the waxed or similar coated chart paper.

On the face 27 of the galvanometer casing K there is mounted a radially extended bracket 28 from which there transversely extends an insulating guide bar 29 serving to exercise a positive but relatively light pressure downwardly against the stylus as to maintain the free end thereof in desired writing position (see Figs. 6 and 11), such pressure, however, being of an order as will not introduce frictional or other effects which might restrain the stylus from its transverse reciprocation under influence of the driving coil of the galvanometer.

On the other face 30 of the galvanometer casing K there is mounted a radially extending and offset lever 31 the free end 32 of which is of flat conformation and is locked by leaf spring 33 mounted on pillar 34 (see Fig. 3) to maintain the galvanometer and its associated elements in predetermined operative position as shown in Fig. 6. The galvanometer and its associated elements may be angularly displaced about the axial journal mounting of the galvanometer by manually displacing lever 31 from its operative (full line) position to the inoperative (dotted line) position. (See Fig. 7.)

The chart roll assembly and mounting therefor as shown in Figs. 5 and 6 consists of spaced pillars 34 and 35 having interiorly disposed vertically extending grooves 36 and 37 and a chart carrying frame F, having the legs 38 and 39 from which project pins 40 for guiding the frame for vertical reciprocation and support in the grooves of the pillars. The frame F mounts a roll of chart paper O wound about a shaft 41 separably journalled between the legs 38 and 39 thereof for rotative movement in an amount and at a speed determined by the action of the feed rolls associated with the driving mechanism to be later described.

Referring particularly to Figs. 6 to 10 wherein the structure and operation of the writing table and chart drive assembly is shown, such unit comprises the following elements: A motor M is journalled to a wall W—3 of the chassis and mounts on its drive shaft a gear 42 for actuating sprocket chains 43 to rotate gear 44 mounted at one end of feed roll 45 journalled for rotation between the chassis walls W—2 and W—3. A frame T the opposing legs 47 and 48 of which are connected at one end by a block 49 defining at its upper face a table or writing surface, and at the other end by a cooperating feed roll 46 have positioned therebetween a mounting rod 50 the ends of which are journalled in the walls W—2 and W—3 of the chassis to provide the angular displacement of the frame T and thereby the writing table 49 and the feed roll 46. The ends of the feed roll 46 extend into arcuate slots 51 and 52 formed in the walls W—2 and W—3 of the chassis to limit the angular movement of the frame T. A pair of tension springs 53 and 54 are mounted at the opposite ends of rod 50, one of the free ends of each spring being locked in a groove 57 in the undersurface of the table and the other free end of each spring being locked at a notch 58 in the walls W—2 and W—3 of the chassis, the springs being so tensioned that normally the writing table 49 is in parallelism with the free end of the stylus and the driven feed roll 46 is in close proximity to the driver roll 45. The chart paper from roll O is fed across the writing surface of table 49 through end guide plates 59a and 59b thereon and between the feed rolls 45 and 46 which are respectively provided with resilient collars to provide sufficient frictional contact with the chart paper to displace the same as the motor drives feed roll 45. The free end of the chart passes from the feed rolls through slit 60 in the cabinet.

Since it is necessary, upon occasion, to replace the chart roll O or to make adjustments in the mechanical or electrical elements of the apparatus, it is advisable to provide for the displacement of the stylus point from normally contacting position with the chart paper. This is accomplished in the following manner: A lever 61 carrying a cam follower 62 is mounted on wall W—2 of the chassis; the leg 48 of the frame T adjacent such lever has a cam surface 63 which upon contact with the cam follower in the angular movement of the lever causes the frame to be angularly displaced against the tension of springs 53 and 54 to the position shown in Fig. 7, at which position the writing surface of the chart paper carried on the table 49 is displaced below and out of contact with the stylus writing loop and driven feed roll 46 is moved out of cooperative association with driver feed roll 45; upon reversing the movement of the lever, the tension springs 53 and 54 return the writing table 49 and the feed roll 46 to their respective operative positions.

In order to provide for calibration of the amplifier current and its associated writing galvanometer, a source of standardizing potential is periodically introduced into the circuit in the following manner: Cam 64 mounted on feed roll 45 for continuous rotation therewith incorporates a hump 65 for "making" switch contact 66 periodically; only, however when the switch contact 67 is "made" by the maintenance of the writing table in its horizontal operative position.

While I have described my invention with reference to a preferred embodiment thereof illustrated in the drawings, it is to be understood that many changes and modifications may be made therein without departing from the spirit of the invention or exceeding the scope of the claims.

I claim:

1. In an electro-cardiograph, a movable coil galvanometer, a stylus actuable by the movement of the coil of the galvanometer in a magnetic field, and an amplifier circuit connected at its output to the galvanometer and its input to a patient for transmitting the cardiac action from the patient to the galvanometer, and an auxiliary coil operatively associated with the galvanometer coil and with the amplifier circuit said auxiliary coil being simultaneously movable with the galvanometer coil in the same magnetic field, said auxiliary coil being adapted to develop a potential in the amplifier circuit and serving by its movement in a phase opposing the potential developed in the amplifier circuit by virtue of the inertia of movement of the stylus initiated by the galvanometer coil actuation.

2. In an electro-cardiograph, a movable coil galvanometer, a stylus actuable by the movement of the coil of the galvanometer in a magnetic field and an amplifier circuit connected at its output to the galvanometer and its input to a patient for transmitting the cardiac action from the patient to the galvanometer, and an auxiliary coil actuable with the galvanometer coil and coupled with the amplifier circuit, said auxiliary coil being simultaneously movable with the galvanometer coil in the same magnetic field, said auxiliary coil being adapted to develop a potential in the amplifier circuit and serving by its movement in a phase opposing the potential developed in the amplifier circuit by virtue of the inertia of movement of the stylus initiated by the galvanometer coil actuation.

3. In an electro-cardiograph, a movable coil galvanometer, a stylus actuable by the movement of the coil of the galvanometer in a magnetic field and an amplifier circuit connected at its output to the galvanometer and its input to a patient for transmitting the cardiac action potential from the patient to the galvanometer and an auxiliary coil mechanically coupled with the galvanometer coil for simultaneous movement therewith in the same magnetic field and electrically coupled with the amplifier circuit, said auxiliary coil being adapted to develop a potential in the amplifier circuit in a phase opposing the potential developed in the amplifier circuit by virtue of the inertia of movement of the stylus initiated by the galvanometer coil actuation.

4. In an electro-cardiograph, in combination with a movable galvanometer coil actuated stylus for delineating, on a chart, cardiac action developed in a patient and as translated into electrical potentials transmitted from the patient to the galvanometer by an amplifying circuit, an auxiliary coil operatively associated with said galvanometer coil for simultaneous movement therewith in the same magnetic field and coupled with the amplifier circuit to provide a potential in phase and quantum opposite to the potential developed by the inertia product introduced in the amplifier circuit, by the movement of the stylus in its actuation by the galvanometer coil.

5. In an electro-cardiograph, in combination with a galvanometer coil actuated stylus for delineating, on a chart, cardiac action developed in a patient and as translated into electrical potentials transmitted from the patient to the galvanometer by an amplifying circuit, an auxiliary coil mechanically coupled with said galvanometer coil for simultaneous movement therewith in the same magnetic field and coupled with the amplifier circuit to provide a potential in phase and quantum opposite to the potential developed by the inertia product introduced in the amplifier circuit, by the movement of the stylus in its movement initiated by the galvanometer coil.

6. In an electro-cardiograph, in combination with a galvanometer coil actuated stylus for delineating, on a chart, cardiac action potentials developed in a patient translated into electrical potentials and transmitted to the galvanometer by an amplifying circuit wherein an error is developed by the stylus due to inertia introduced in the swinging movement thereof under actuation of the galvanometer coil, an auxiliary coil operatively coupled with the galvanometer coil for simultaneous movement therewith in the same magnetic field and coupled with the amplifying circuit to develop a potential in phase and quantum opposite to that acting on the stylus due to inertia, thereby to critically damp the galvanometer, and means for introducing regenerative feed back into the circuit to compensate for the disruptive effect in the velocity-frequency characteristics produced in the circuit by said critical damping.

7. In an electro-cardiograph, in combination with a galvanometer coil actuated stylus for delineating, on a chart, cardiac action potentials developed in a patient translated into electrical potentials and transmitted to the galvanometer by an amplifying circuit wherein an error is developed by the stylus due to inertia introduced in the swinging movement thereof under actuation of the galvanometer coil, an auxiliary coil mechanically connected with the galvanometer coil for simultaneous movement therewith in the same magnetic field and coupled with the amplifying circuit to develop a potential in phase and quantum opposite to that acting on the stylus due to inertia, thereby to critically damp the galvanometer, and means for introducing regenerative feed back into the circuit to compensate for the disruptive effect in the velocity-frequency characteristics produced in the circuit by said critical damping.

PAUL TRAUGOTT.

REFERENCES CITED

The following references are of record in the file of this patent:

UNITED STATES PATENTS

| Number | Name | Date |
|---|---|---|
| 1,647,710 | Nichols | Nov. 1, 1927 |
| 2,124,208 | Paully | July 19, 1938 |
| 2,213,099 | Adorjian | Aug. 27, 1940 |
| 2,289,301 | Barber | July 7, 1942 |
| 2,352,242 | Apstein | June 27, 1944 |